(12) United States Patent
Gross

(10) Patent No.: US 6,721,716 B1
(45) Date of Patent: Apr. 13, 2004

(54) PAYMENT CERTIFICATION STRING AND RELATED ELECTRONIC PAYMENT SYSTEM AND METHOD

(75) Inventor: Mitchell I. Gross, Eastchester, NY (US)

(73) Assignee: Mobius Management Systems, Inc., Rye, NY (US)

( * ) Notice: Subject to any disclaimer, the term of this patent is extended or adjusted under 35 U.S.C. 154(b) by 673 days.

(21) Appl. No.: 09/676,692

(22) Filed: Sep. 29, 2000

Related U.S. Application Data

(63) Continuation-in-part of application No. 09/334,876, filed on Jun. 17, 1999.

(51) Int. Cl.⁷ .............................................. G06F 17/60
(52) U.S. Cl. ........................... 705/40; 705/34; 705/39; 705/50; 705/44; 705/75; 705/76; 705/78; 705/80
(58) Field of Search ............................. 705/34, 39, 40, 705/50, 44, 75, 76, 78, 80

(56) References Cited

U.S. PATENT DOCUMENTS

| | | | |
|---|---|---|---|
| 4,823,264 A | 4/1989 | Deming | |
| 5,007,084 A | 4/1991 | Materna et al. | |
| 5,220,501 A | 6/1993 | Lawlor et al. | |
| 5,283,829 A | 2/1994 | Anderson | |
| 5,465,206 A | 11/1995 | Hilt et al. | |
| 5,649,117 A | 7/1997 | Landry | |
| 5,684,965 A | 11/1997 | Pickering | |
| 5,692,132 A | 11/1997 | Hogan | |
| 5,699,528 A | 12/1997 | Hogan | |
| 5,754,653 A | 5/1998 | Canfield | |
| 5,761,650 A | 6/1998 | Munsil et al. | |
| 5,783,808 A | 7/1998 | Josephson | |
| 5,790,793 A | 8/1998 | Higley | |
| 5,832,460 A | 11/1998 | Bednar et al. | |
| 5,873,072 A | 2/1999 | Kight et al. | |
| 5,884,288 A | 3/1999 | Chang et al. | |
| 5,893,077 A | 4/1999 | Griffin | |
| 5,893,080 A | 4/1999 | McGurl et al. | |

(List continued on next page.)

FOREIGN PATENT DOCUMENTS

EP    Wo9905628    *   2/1999

OTHER PUBLICATIONS

Epper "Checkfree to test on–line payment with utility companies in 3 states"; Oct. 1995, American Banker, v160, n218, p14(1 Dialog file 148, Accession No. 08297809.*

(List continued on next page.)

Primary Examiner—Romain Jeanty
(74) Attorney, Agent, or Firm—Kramer Levin Naftalis & Frankel LLP

(57) ABSTRACT

An electronic statement, bill presentment and payment system and method includes a customer client software program and client database, and a biller server software program and server database connected over an electronic information network. A customer enrolls with a biller by communicating a request between the client and server programs including information about a funding account. The biller confirms customer account information and verifies the funding account and updates the status of the enrollment request to the customer. Electronic bill summary and/or detail information is communicated to or polled from the biller server and consolidated at the customer client software. The customer may then retrieve bill summary and/or detail information and/or communicate payment instructions authorizing an electronic transfer from the funding account to the biller. In addition, a payment certification string including funding account information is generated and transmitted to a validation server which confirms the payment instructions.

30 Claims, 5 Drawing Sheets

U.S. PATENT DOCUMENTS

| | | | |
|---|---|---|---|
| 5,903,881 A | | 5/1999 | Schrader et al. |
| 5,920,847 A | | 7/1999 | Kolling et al. |
| 5,920,848 A | | 7/1999 | Schutzer et al. |
| 5,943,656 A | | 8/1999 | Crooks et al. |
| 5,966,698 A | | 10/1999 | Pollin |
| 5,970,475 A | | 10/1999 | Barnes et al. |
| 6,049,786 A | * | 4/2000 | Smorodinsky ............... 705/40 |
| 6,070,150 A | | 5/2000 | Remington et al. |
| 6,078,907 A | | 6/2000 | Lamm |
| 6,081,790 A | | 6/2000 | Rosen |
| 6,085,171 A | | 7/2000 | Leonard |
| 6,104,704 A | | 8/2000 | Buhler et al. |
| 6,185,613 B1 | | 2/2001 | Lawson et al. |
| 6,246,996 B1 | * | 6/2001 | Stein et al. .................... 705/26 |
| 6,289,322 B1 | | 9/2001 | Kitchen et al. |
| 6,317,490 B1 | | 11/2001 | Cameron et al. |
| 6,339,766 B1 | * | 1/2002 | Gephart ....................... 705/44 |
| 6,578,015 B1 | * | 6/2003 | Haseltine et al. ............. 705/34 |

OTHER PUBLICATIONS

"Electronic Bill Payment/Presentment Business Practices," InteroeraBill Initiative of the Banking Industry Technology Secretariat (BITS), Jun. 4, 1999, pp. 5–18.

"An overview of Electronic Bill Presentment and Payment Operating Models Process, Roles, Communications, and Transaction Flows," Prepared by the Business Practices Task Force of NACHA's Council for Electronic Billing and Payment, Apr. 9, 1999.

Alan Greenspan, "Retail payment systems," Remarks by Chairman Alan Greenspan Before the National Automated Clearinghouse Association Annual Meeting, Los Angeles, California (via videoconference), Apr. 10, 2000.

* cited by examiner

PAYMENT CERTIFICATION STRING AND RELATED ELECTRONIC PAYMENT SYSTEM AND METHOD

CROSS REFERENCE TO RELATED APPLICATIONS

This invention claims the benefit of priority from and is a continuation-in-part of U.S. application Ser. No. 09/334,876 filed Jun. 17, 1999 now pending.

BACKGROUND OF THE INVENTION

This invention relates generally to a client/server software solution for collecting, summarizing and storing individualized content information and allowing a user of the software to provide a directed response thereto, and, more particularly, for example, to a computerized electronic statement, bill presentment and payment system and a method of presenting bills electronically to a customer and initiating payments and other instructions by computer.

While several electronic bill presentment and payment systems have recently been developed, systems which collect and present bill information from individual billers have typically required that the user contact each biller that provides electronic bill presentment and payment services separately to set-up and use such services. These services have the disadvantage of requiring the user to contact each biller each time bill information is desired and of requiring the user to enter payment account information each time the service is configured. Moreover, the user has the additional difficulty in managing the information and deriving summary information from several related bills (for example, all the bills due for a given month) because the information is not collected in a single document. Since each biller may use different software and bill formats for presenting electronic bills, the user will have the problem of obtaining and managing several different software programs. There is also the additional difficulty of centrally managing personal assets and cash flow with respect to the user's personal accounts bank and credit and tracking outstanding or paid bills. From the biller's perspective, the biller also has problems in managing cash flow and accounts receivable with respect to customer payments.

More recently, electronic bill presentment and payment services have been provided by third party consolidators. Various billers format electronic bills according to a standard prescribed by the consolidator and send the information to the consolidator. A user connects to the consolidator to review the current bills and provide instructions for payment. The consolidator will typically process the payment instructions from the user on behalf of all of the billers.

In order for such systems to be useful, a wide variety of billers must agree to provide bills in the prescribed format to a single consolidator. In that way, a user would need to only connect with a single consolidator in order to review all or many of his bills and/or provide payment instructions. However, such systems have the problem that the user may not wish the third party consolidator to have access to all of the information contained in that user's electronic bills. Additionally, in all likelihood, there will inevitably be several consolidators competing to sign up billers and users, each one having a sub-set of a user's billers. In such a situation, it would not be efficient for the user to connect to the several consolidators needed to retrieve and pay all of his bills and manage his information in one program.

In any electronic bill presentment and payment system, it is generally difficult and expensive to collect the bill detail information and format it in a manner consistent with the consolidators. Furthermore, individual billers may have information to send to customers that does not fit in with a consolidator's presentment format.

What is desired is an electronic statement, bill presentment and payment system and method that overcomes the limitations of the prior art. A system and method is desired which would permit electronic statement, bill presentment and payment services to be provided to a user by a wide variety of billers in which the user can centrally manage all of his electronic statements, bills, and in which no third party consolidator is used, and in which such services are provided in a secure manner assuring the user's privacy.

In another aspect, the invention relates to an electronic payment system and method, and more particularly to such a system and method for processing payments from a checking account or other funding account using a payment certification string comprising funding account information of a customer, and validation information of a certifying authority.

Up to the present, processing of electronic payments from a customer to a biller has generally required the biller to participate in a global electronic transaction network and confirm that funding account information provided by the customer is correct. In the case of customer checking accounts, automated clearinghouse (ACH) transactions have been used to accommodate the electronic clearing of checks. In general, the processors of the ACH system have required the biller to maintain a signature card on file for a customer in order to accept electronic checks from that customer. Therefore, payment by electronic checks has only been used regularly where there is an established, continual relationship between a biller or other vendor and the customer or other purchaser.

As a result, electronic checks have not generally been used for Internet commerce where a purchase may be made on a onetime basis from a merchant. In fact, generally, the merchant will require payment at the time of purchase and the parties to the transaction may have had no previous contact.

What is desired is a system and method for processing electronic payment instructions of a customer to a biller, preferably using electronic checks, that overcomes the limitations of the prior art. A system and method is desired which would permit immediate processing of an ACH payment from a customer to an e-commerce vendor (biller) even when there is no established relationship between the customer and the biller, and no signature card of the customer on file with the biller.

SUMMARY OF THE INVENTION

Generally speaking, in accordance with the present invention, an electronic individualized content presentment and directed response system is provided. The system advantageously provides for a method of presenting electronic content individualized for a specific user from several content providers and allows that user to initiate directed instructions to each content provider responsive to the content. The system is constructed and arranged to assure a secure and private connection, and transfer of information directly between a content provider and an individual recipient.

In a preferred embodiment directed to an electronic statement, bill presentment and payment system, computer software allows a customer to view statements and bills from multiple billers and make payments to the billers using a personal computer, Web TV, personal digital assistant or the like connected to a digital electronic or global communications network. The software eliminates the need for both the customer and the biller to sign up with a consolidator, and allows the biller and the customer to interact directly.

The system of the invention comprises an end user electronic desktop application (the client) which communicates over, for example, the Internet with one or more server applications (each a server) associated with each content provider. While the detailed discussion of a preferred embodiment includes a description of the system and method being advantageously used for statement and bill presentment and payment services, other interactive and individualized communications between a user and a content provider are contemplated within the scope of the invention and will be separately described as appropriate.

A preferred embodiment of the method and system for electronic statement, bill presentment and payment may provide the following services among others:

Biller Account and Funding Account Maintenance

This includes enrollment with a biller for statement and bill presentment and payment as well as management of changes to the biller account information and/or funding account information.

Statement Notification

Notification may be provided to the customer that new bills or statements are available from a biller. This may be by an email from the biller or by an indication maintained at the client, such as a time or date trigger or pursuant to a pre-defined billing cycle.

Retrieval and Archival of Statement Data

In response to statement notifications sent from billers, or otherwise indicated at the client, such as on the billing cycle day, the client retrieves the statement summary and detail data from the biller and archives this data on the user's computer.

Review Statements Account Activity/status

The client application provides a GUI (graphical user interface) from which the user can access a consolidated summary of bills, statements or other account activity from all billers. The summary and detail information may include various types of content retrieved from providers of individualized content such as statements, bills, notifications, invoices, bank/brokerage statements, other account statements, voting proxy requests, insurance policy proposals, loan proposals, magazine articles, and the like. The summary view may also include advertising provided from the content providers or other sources. Where several content providers include advertising and the like, the client may rotate each ad into a banner or other location on the GUI or otherwise display such ads. Furthermore, when the user requests and/or views detail information, the client may display that content provider's ads.

Directed Response

From the summary screen, the user may view the detail information, or provide directed instruction back to the provider. For example, for statements and bills, the user may initiate payment instructions. The client also allows the user to track the status of account activity such as enrollment and payment requests.

Polling

The client may automatically check for new statement and bill summary and detail information as directed by the user, or, for example, at every billing cycle. Intelligent polling based on a billing cycle or the like will help to prevent overloading at the biller's server which might otherwise be caused by too much electronic communications traffic.

Bill Payment

From the summary screen the user may send payment instructions to all billers, for example, for whom bills are due. The GUI will allow paying all current bills with a single mouse click. Additional payment options, such as payments of the minimum amount due, partial payments, prepayments or automatically scheduled payments such as recurring payments are also available.

Account Receivable Update

Statement providers and billers may use information about pending payments and future scheduled payments to update their accounts receivable data.

Generally speaking, in accordance with another aspect of the invention, a payment process using a payment certification string comprising encrypted funding account information of a customer, and digital validation information of a certifying authority is provided. The system and process advantageously allows a user to pay for Internet commerce transactions via electronic check even if the vendor does not have a signature card for the user on file. Validation by the certifying authority can provide authorization for the payment.

In a preferred embodiment, a computerized method and system for processing electronic payment instructions of a customer to a biller includes a client application with customer profile information operable by a customer. The customer operates the client application and enters the particulars (i.e., account information) of his or her funding source to be used to make electronic payments. The client application generates unique funding account information from the entered information. The client application then generates a payment certification string including a validation indicating portion from the unique funding account information, and sets the validation indicating portion to invalid (since it has not been confirmed). Once the payment certification string is created, the client application can use it to extract the unique funding account information as needed.

The system and method also includes a validation server. The client application sends the extracted funding account information to the validation server over a secure electronic communication channel and the validation server confirms that the funding account information can be used to make an electronic payment from the source of funds. In a preferred embodiment, the validation server, by use of personal questions known only to the applicant, attempts to ensure that the funding account in fact belongs to the applicant. Once confirmed, the validation server generates a validation string specifically associated with the funding account information and sends the validation string to the client application. Alternatively, the client application is instructed by a secured communication from the validation server to create the certification string on the client and indicate that the funding account information is valid. In a preferred embodiment, the customer then designates a secure password to secure the payment certification string and the client application requires this password to be supplied prior to accessing any functions related to the payment certification string.

To use the system to transfer funds, the client application generates (in response to input from the customer) an electronic payment instruction authorizing payment to a biller or vendor from the validated source of funds. In the preferred embodiment, the customer, at the time of using the client application to make a payment, must enter their password to enable the client application to generate the payment instructions. This secures the system to ensure that only the owner of the funding account information is able to use the payment certification string to effectuate a transfer of funds.

The electronic payment instruction includes the funding account information extracted from said payment certification string if the validation indicating portion indicates that the funding account information is valid. Finally, the client application transmits the electronic payment instruction to the biller; and the biller processes the electronic payment instruction and receives payment from the said source of funds. The biller can thus rely on the validation of the certifying authority (for example, in lieu of a signature card on file) to process the electronic payment transaction.

Note, as a measure of security to the customer, it is preferable to delete all traces of the customer's funding account information on the client application once the payment certification string is generated. In use, the funding account information is extracted from the payment certification string only when needed, and preferably only after entry of the unlocking password, and then only for transmission over a secure electronic communication channel.

Accordingly, it is an object of the present invention to provide an improved electronic individualized content presentment and directed response system and method that allows for the collection and summary of individualized content from several unrelated content providers and does not require a third party consolidator.

Another object of the invention is to provide an improved electronic individualized content presentment and directed response system and method capable of providing a secure connection between a content provider and a user for transferring individualized content and/or directed response information.

A further object of the invention is to provide an improved electronic individualized content presentment and directed response system and method used for electronic statement, bill presentment and payment services that allows for the collection and summary of statements and bills from several unrelated billers and does not require a third party consolidator.

Still another object of the invention is to provide an improved electronic bill presentment and payment system capable of providing a secure connection between a biller and a customer for transferring statement, bill and/or payment instruction information.

Still a further object of the invention is to provide a means for minimizing the costs associated with processing statements and bills by transmitting statements and bills and receiving payment instructions electronically.

Yet another object of the invention is to provide for customer desktop archiving of electronic documents including bills and bill detail information for review by the user or for use by an intelligent agent in analyzing such data.

Yet a further object of the invention is to provide a customer desktop data source for use by external software programs and intelligent agents.

Still yet another object of the present invention is to permit a user to enter funding account information only once and use it to pay several billers, and to allow use of multiple funding accounts with respect to any one biller, all while maintaining the privacy and security of the funding account by storing the information on the user's computing platform.

Still yet a further object of the present invention is to provide a payment certification string including funding account information of a customer and validation information of a certifying authority while preventing unauthorized disclosure of the particulars of the customer's funding source.

Still other objects and advantages of the invention will in part be obvious and will in part be apparent from the specification and drawings.

The invention accordingly comprises the several steps and the relation of one or more of such steps with respect to each of the others, and the system embodying features of construction, combinations of elements, and arrangement of components which are adapted to effect such steps, all as exemplified in the following detailed disclosure of such steps and system as hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
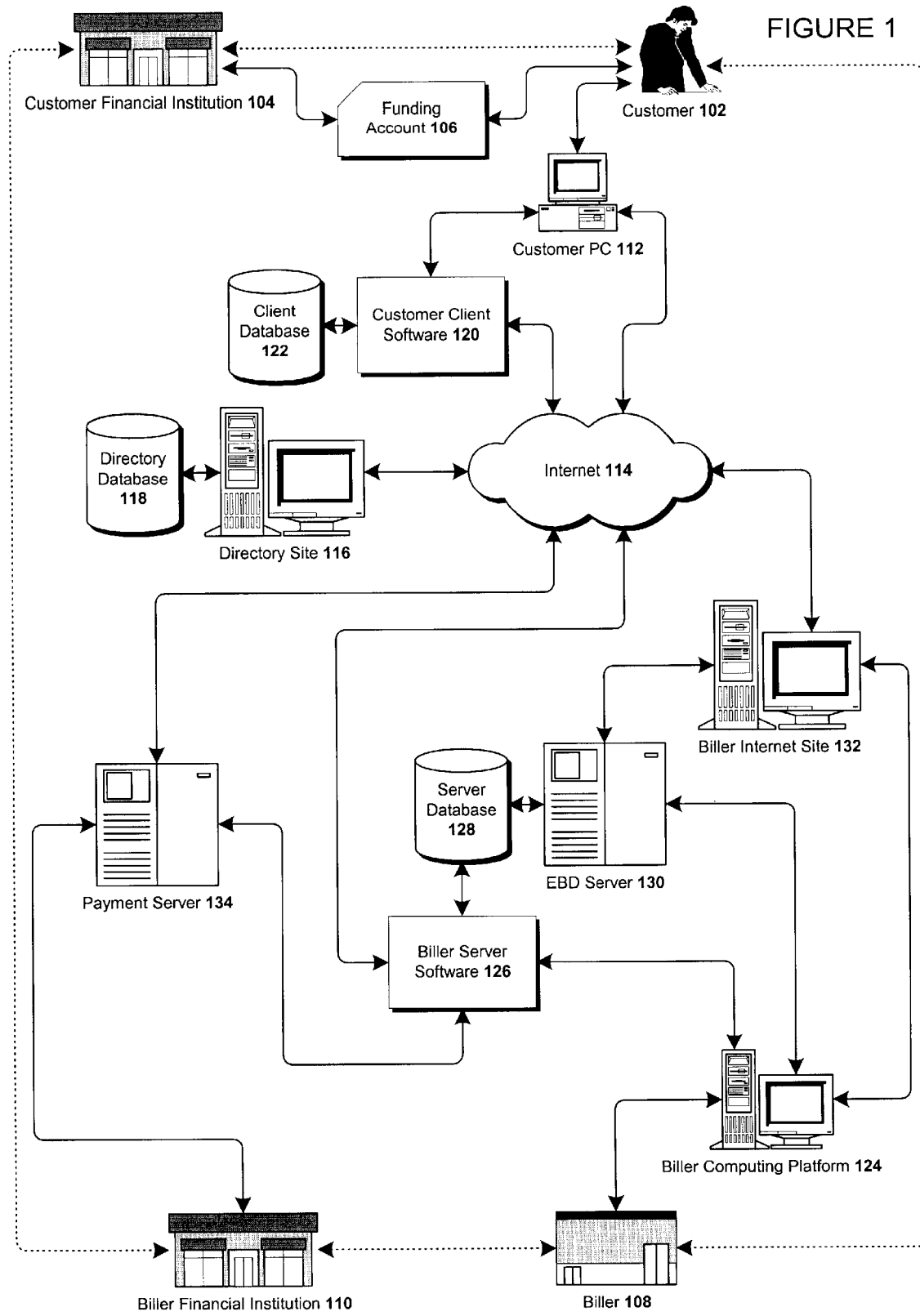
FIG. 1 is a schematic overview of certain physical and logical components of an electronic bill presentment and payment system constructed and arranged in accordance with a preferred embodiment of the present invention.

The following terms are defined for convenience. Where the content suggests a different meaning, these definitions are not intended to be limiting.

Client: This is the software that runs on a user's computing platform, which platform may include a personal computer (PC), a workstation on a network, a personal digital assistant (PDA), Web TV or the like. These application(s) communicate with servers to enroll for services such as statement and bill presentment and payment, to retrieve information such as statements and bills and to submit requests such as payment and account modification requests. The client stores and maintains appropriate retrieved information at the user's computing platform. The client software provides a GUI with consolidated views of all information and customer activity. Typically, the GUI will run as a standalone application. Alternatively, the GUI may run as a browser plug-in. Advantageously, the client itself allows an interface to intelligent agents, such as plug-in applications, which access and analyze the information stored by the client. One example of an intelligent agent is an application which analyzes bill payment history in the client database and makes recommendations for credit products (such as a home equity loan or a credit card) based on the information analyzed. Another example of an intelligent agent is an application which analyzes stock portfolio transaction history and makes recommendations with respect thereto.

Customer: This is a person who uses the client applications to access services such as bill presentment and payment. This is also referred to as a user or subscriber.

Server: Any device or system which stores, processes and provides data to another device or system. For example, the server may be computer software and hardware used by the biller or other content provider and provides the connection to the client for accessing services such as statement or bill presentment and payment. There may be separate modules for different services, such as statement or bill presentment, as well as a separate payment module to process payments for these services. This allows the biller to process payments at a different site from the one which provides presentment services, among other things, and adds an additional level of security and privacy to the transactions.

Content Provider: This is an entity that provides goods or services or content to the customer, and from which the customer receives content, such as statements, bills and the like, and to which payments or other directed responses may be made. A preferred embodiment of the invention is geared toward consolidation at the user desktop of statements, bills and other related financial data such as bank account statements and/or voting proxy requests to provide a desktop financial consolidation portal. In other embodiments, any information and/or content, such as pay-per-view content can be transmitted. This is also called a service provider, or in some embodiments, a biller or vendor.

Electronic Bill Detail Server (EBD): A system or device associated with the biller that contains and provides statement or bill detail and summary information.

Reference is first made to FIG. 1 of the drawings, which shows in overview a schematic block diagram of certain physical and logical components of an electronic statement, bill presentment and payment system in accordance with a preferred embodiment of the present invention. The electronic statement, bill presentment and payment system of the invention comprises a client/server software application running over various inter-networked computers as shown.

A customer 102 has an account at a customer financial institution 104 to which customer 102 may make deposits and withdrawals of funds. Customer 102 may also authorize customer financial institution 104 to electronically transfer funds from a funding account 106 directly to another account in order to provide payment to the owner of that other account.

Customer 102 may also make purchases of goods or services from a biller 108 that will use the system of the invention to electronically present statements and bills for that purchase to customer 102 and receive payment instructions. Biller 108 may also be any entity which wishes to present a bill or other statement to customer 102 and/or receive payment or other responses from customer 102 with respect to the bill or statement. For example, biller 108 may be a credit card company presenting monthly statements to, and receiving payment authorizations from customer 102, or biller 108 may be a financial account administrator or other content provider presenting quarterly reports, voting proxy requests, insurance policy proposals, loan proposals or other individualized financial information to, and receiving buy/sell, voting, acceptance or refusal of proposals or other responsive instructions from customer 102 with respect to the individualized information.

Biller 108 has an account at a biller financial institution 110 to which biller 108 may make deposits and withdrawals of funds. Alternatively, biller 108 may itself be a financial institution, in which case biller 108 performs the functions of biller financial institution 110 for the purposes of this discussion. Customer financial institution 104 and biller financial institution 110 will typically be connected through an electronic network for transferring funds among financial institutions, such as the automated clearinghouse network (ACH), the Society For Worldwide Interbank Financial Transactions (SWIFT) network, or Clearinghouse for Interbank Payment Systems (CHIPS) network or other electronic cash systems, such as E-cash or Netcash, or through other payment mechanisms such as the Automated Teller Machine (ATM) network, and the like. The financial institution network allows customer financial institution 104 and biller financial institution 110 to transfer funds between them on behalf of customer 102 and biller 108, respectively.

Customer 102 will typically use customer PC 112 or other computing platform to connect to a global electronic network, such as the Internet 114, using any communications means, such as a modem and dial-up account, or an ISDN line or other network connection. Alternatively, customer 102 may connect to Internet 114 by other means, such as Web TV, a network card or other communications interface. Customer 102 will then typically establish a connection with a directory site 116 containing a directory of billers, typically by using HTTP to view a page maintained at directory site 116. Alternatively, a telnet connection or ftp connection may be established between customer PC 112 and directory site 116. Directory site 116 will typically include a directory database 118 containing data tables with information about various billers accessible by the system of the invention.

Customer 102 will then have the opportunity to obtain the client portion of the software, the customer client software 120, providing access to the system of the invention. Typically, this will be by downloading customer client software 120 to customer PC 112 directly from directory site 116. Alternatively, customer 102 may provide information to allow customer client software 120 to be delivered to customer 102 through other means, such as by regular mail. Or, customer 102 may obtain customer client software 120 directly from biller 108 or by buying it or receiving it for free at a retail outlet or as a promotional item.

Once obtained, customer 102 can install customer client software 120 on customer PC 112 or other computing platform. Customer client software 120 includes a client database 122 which maintains various database tables containing profile information about customer 102, payment instruction information for funding account 106 related to customer financial institution 104, biller account information related to biller 108, transaction status information, records of completed transactions and intelligent agents and information related thereto, and other information deemed necessary or appropriate for the functions provided. Client database 122 may include additional information used by customer client software 120, or, alternatively, customer client software 120 may receive information needed from any other source, such as by an ODBC, OLE or other API to that source.

Figure 5:
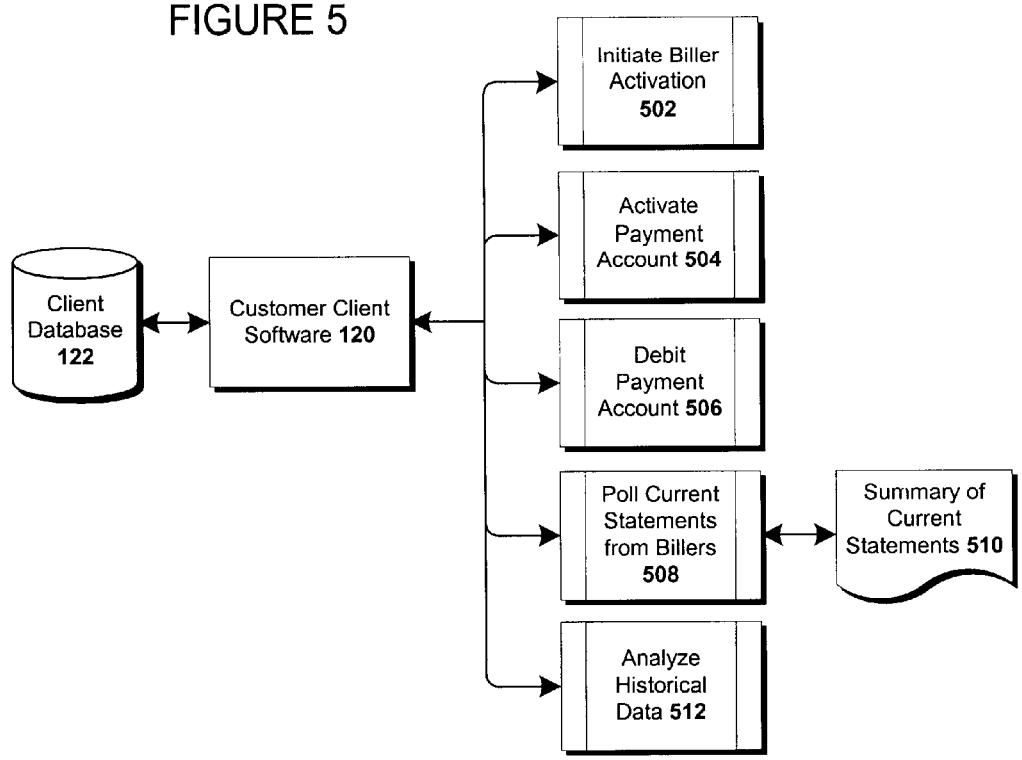
FIG. 5 is a schematic overview of several functions of the client's software constructed and arranged in accordance with a preferred embodiment of the present invention.

Customer client software 120 provides the means for performing the various processes invoked by customer 102 when using the electronic statement, bill presentment and payment system of the invention. As shown with reference to FIG. 5, such processes include, initiating biller activation 502 in order to establish instructions and a connection with biller 108 for being presented with electronic statements and bills, activating payment account 504 in order to establish instructions for paying bills from funding account 106, debiting payment account 506 in order to pay bills to biller 108 from funding account 106 at customer financial institution 104, polling for current statement from billers 508 in order to prepare a summary of current statements 510 to show customer 102 outstanding bill amounts and provide the opportunity to retrieve detailed bills and/or pay outstanding amounts or a portion thereof in response thereto; and analyzing or reviewing historical or archival data 512 from client database 122.

Biller 108 will typically use biller computing platform 124 to run the server portion of the software, the biller server software 126, providing access to the system of the invention. Biller server software 126 includes a server database 128 which maintains various database tables containing profile information about biller 108, customer account information about customer 102 and statement and bill summary information. Statement and summary information is typically obtained by querying a biller electronic bill detail (EBD) server 130. Biller 108 can also directly access and manage biller EBD server 130 through biller computing platform 124.

Biller 108 will also typically maintain a biller Internet site 132 to provide information to prospective customers and current customers. Biller 108 may also allow customer 102 access to bill detail information received from biller EBD server 130 through biller Internet site 132. In order to protect the privacy of customer 102, access to bill detail information from biller EBD server 130 will typically be restricted and require password access.

Figure 6:
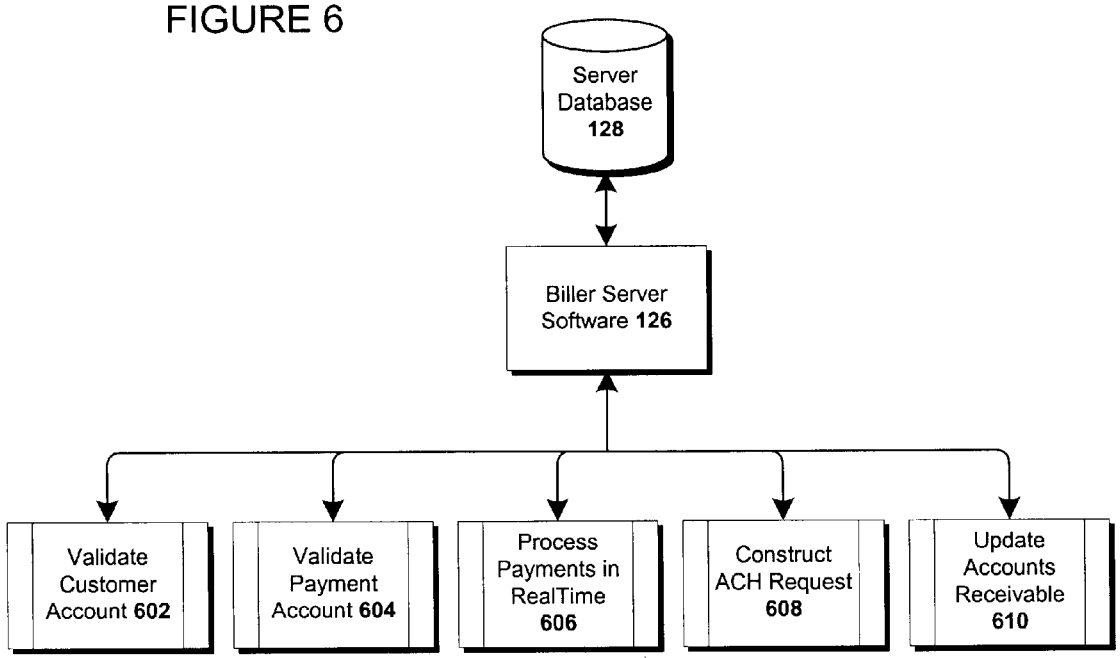
FIG. 6 is a schematic overview of several functions of the server software constructed and arranged in accordance with a preferred embodiment of the present invention.

Biller server software 126 is generally used by biller 108 to accomplish several processes related to the electronic bill presentment and payment system of the invention. As shown with reference to FIG. 6, such processes include, at least, validating customer account 602 in response to a request from customer 102 (through customer client software 120 performing initialize biller activation 502 process), validating customer payment account 604 which is related to funding account 106 at customer financial institution 104 in response to a request from customer 102 (through customer client software 120 performing the activate payment account 504 process), processing payments in real-time 606, constructing an ACH request 608 or the like which is forwarded to biller financial institution 110 for processing of payment instructions and updating accounts receivable 610 for biller 108 from the payment information. Alternatively, several of these process may be provided by a separate payment server 134 when biller 108 does not act as its own payment processor, as shown in FIG. 1.

Biller server software 126 may include functionality for processing payments from customer 102 as thus described. Alternatively, payment server 134 may process payments from customer 102 and advise of such payment to biller server software 126. In this way, biller 108 does not have to directly process payments, or can process payments on payment server 134 which is separate from biller server software 126 in order to enhance security and privacy of those payments. Additionally, because payment server 134 may be a separate entity from biller 108, and may process payments for several entities, customer 102 may more easily make payment instructions by having customer client software 120 contact payment server 134 directly.

Payment server 134 forwards the payment instructions to customer financial institution 104 and biller financial institution 110 for settlement, and notifies biller server software 126 of such transaction. Once the transaction is settled, biller financial institution 110 typically informs biller 108 and biller 108 can reconcile the payment with the notice provided to biller server software 126 by payment server 134.

In this way, the client/server software for electronic bill presentment and payment allows customer 102 to receive bills electronically from biller 108 and pay them electronically by providing instructions to authorize an electronic transfer of funds from customer financial institution 104 to biller financial institution 110.

Having thus described in overview the system for electronic statement, bill presentment and payment of the invention, certain detailed procedures of the invention will now be described.

Software Installation

Customer client software 120 may typically be installed on customer PC 112 or other computing platform in any conventional manner. For example, customer 102 can install customer client software 120 from a CD or downloaded from directory site 116 or biller Internet site 132. Branded versions of the software may also be distributed which include a pre-loaded client database 122 having account information for a specific customer 102 and biller activation information for a specific biller 108.

Biller server software 126 is typically distributed on a CD to biller 108 and may be installed and maintained by biller 108 on biller computing platform 124 in any conventional manner.

Profile Management

Figure 2:
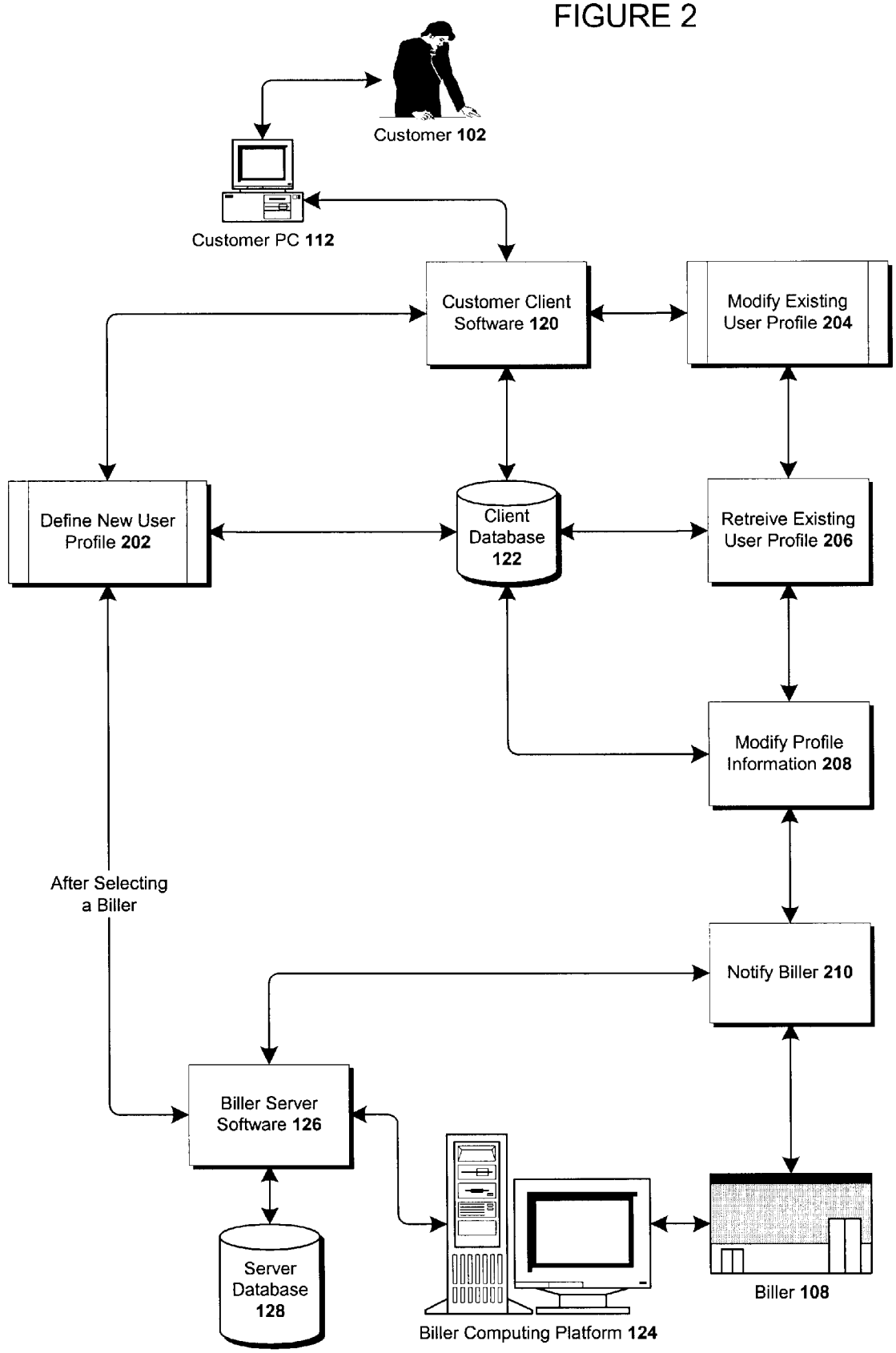
FIG. 2 is a schematic overview of user profile management functions constructed and arranged in accordance with a preferred embodiment of the present invention.

Establishing and managing a user profile for customer 102 is described with respect to FIG. 2, and typically involves the following processes.

User Profile Definition

Customer client software 120 provides customer 102 with a procedure to define a new user profile 202. Procedure 202 typically includes personal information such as name, address, email address, account numbers and the like.

The information in the user profile is stored in client database 122 on the client processor platform and is therefore available to be sent to biller 108 to identify customer 102 when enrolling for electronic statement, bill presentment and payment services.

User Profile Changes

If a user profile is to be changed, customer client software 120 provides customer 102 with a procedure to modify an existing user profile 204. Procedure 204 retrieves the existing user profile 206 from client database 122 and allows customer 102 to modify the profile information 208. The modified information in the user profile is stored in client database 122. Customer client software 120 may then optionally or automatically notify all billers 210 from whom customer 102 has requested bills. The notification may be accomplished by sending an email message to biller 108, or customer client software 120 can submit a request to biller server software 126 to modify server database 128 the next time customer 102 uses the system to connect to biller server software 126. For example, customer 102 may use customer client software 120 to change the email address in the user profile, then customer client software 120 can automatically notify all billers with whom customer 102 has enrolled for bill presentment and payment services of the change. Alternatively, customer 102 may contact biller 108 directly or by other means.

Funding Account

Figure 3:
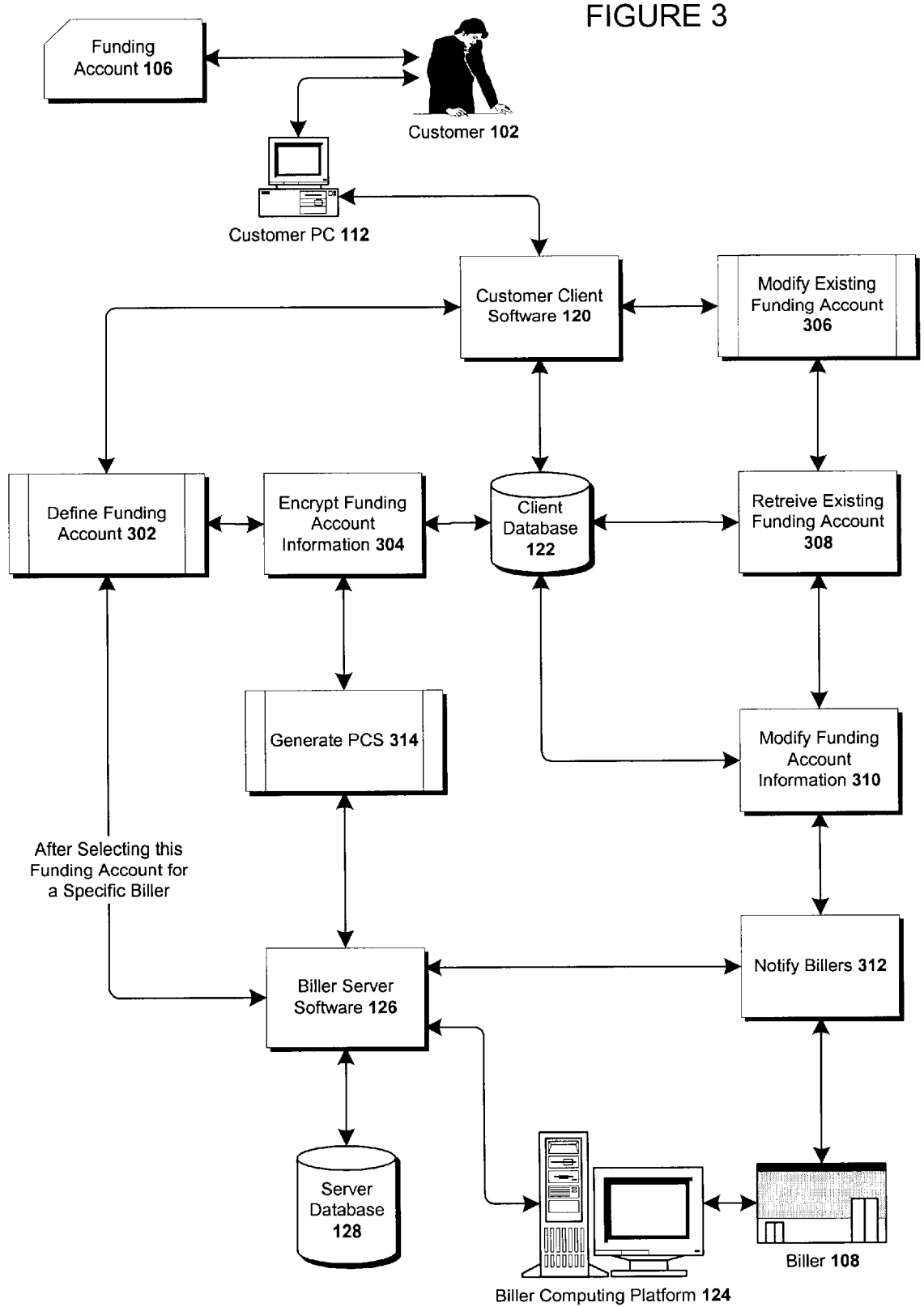
FIG. 3 is a schematic overview of funding account management functions constructed and arranged in accordance with a preferred embodiment of the present invention.

Establishing funding account 106 for customer 102 and using it within the system of the invention is described with respect to FIG. 3, and typically involves the following processes. The present invention allows customer 102 to register funding account 106 once and apply funding account 106 to multiple billers. Alternatively, customer 102 can have multiple funding accounts that are applicable to biller 108.

Funding Account Definition

Customer client software 120 provides customer 102 with a procedure to define a funding account information 302 used to pay biller 108 who accepts electronically initiated payment requests. This includes information with respect to funding account 106 at customer financial institution 104, such as the transit ABA number. Various types of accounts such as checking, savings, credit card, etc. may be defined as funding account 106. The funding account information is sent to biller server software 126 and is stored in server database 128 when enrolling for services for which electronically initiated payments are accepted.

Funding Account Verification

Information regarding funding account 106 is encrypted in a step of encrypting funding account information 304 and is stored in client database 122 in encrypted format. Included with funding account 106 stored in client database 122 will preferably be a Payment Certification String (PCS) (as described further below) which indicates that funding account 106 has been verified. The PCS is available when customer 102 enrolls for services with biller 108.

The first biller 108 to whom an enrollment request for payment services is issued is typically responsible for verifying funding account 106 in a manner consistent with the financial transaction network used to process payments, and generating the PCS 314. Thus, in this case, biller 108 acts as a certifying authority for validating financial account information 302. The PCS is then included with the encrypted funding account information. The PCS can be used by biller 108 as assurance that funding account 106 is valid. However, a biller 108 may decide to do its own verification of funding account 106 regardless of whether the PCS indicates that verification has already been done. In such a case, biller 108 may provide an additional PCS for funding account 106.

Thus, any later enrollment request includes validated funding account information that is sent to each biller 108 with whom customer 102 is enrolling for payment services.

Alternatively, a central payment verification or certifying authority, which may be associated with directory site 116, may be used to verify funding account 106 and return the PCS at the time funding account 106 is defined in customer client software 120. Thus, in this case, directory site 116 acts as the certifying authority. The verification information may also be stored in directory database 118 associated with directory site 116, and accessed through directory site 116 by any biller 108 who seeks verification of a specific funding account 106 for a specific customer 102.

In another embodiment of the present invention, the encrypted funding account information forms a portion of the payment certification string. Thus, in this case the payment certification string is generated by customer client software 120. In this embodiment, the payment certification string includes a validation indicating portion used to indicate whether the payment certification string has been validated by a certifying authority. Customer client software 120 extracts funding account information from the payment certification string and communicates it to biller server software 126 or to another certifying authority for validation. Preferably such communication will be over a secured electronic channel. The certifying authority returns a validation string, or may return an instruction to enable the client application to generate a validation string, which is used by customer client software 120 to modify the validation indicating portion of the payment certification string to indicate that the funding account information is valid.

The validation string may typically include an electronic signature of the certifying authority or the client application and a hash function of the funding account information. Since an electronic signature can not easily be tampered with, verification of validation may be easily determined. Further, by use of a hash function, it may be easily verified that the funding account information has not been modified.

Once the payment certification string is validated, the original funding account information can be extracted from the payment certification string and transmitted to billers for executing electronic payments as needed.

Funding Account Changes

If funding account 106 is to be changed, customer client software 120 provides customer 102 with a procedure to modify an existing funding account 306. Procedure 306 retrieves the existing funding account representation 308 from client database 122 and allows customer 102 to modify the funding account information 310. The modified information is stored in client database 122. Customer client software 120 may then optionally or automatically notify all billers 312 from whom customer 102 has enrolled for payment with funding account 106. The notification may be accomplished by sending an email message to biller 108, or customer client software 120 can directly modify server database 128 by sending a message to biller server software 126 the next time customer 102 uses the system to connect to biller server software 126. Alternatively, the message may be sent to payment server software 150 which sends a message to biller server software 126. Customer client software 120 and biller server software 126 also communicate with one another to determine what to do about payment requests submitted before the change to funding account 106 has been processed.

Enrollment Requests

Figure 4:
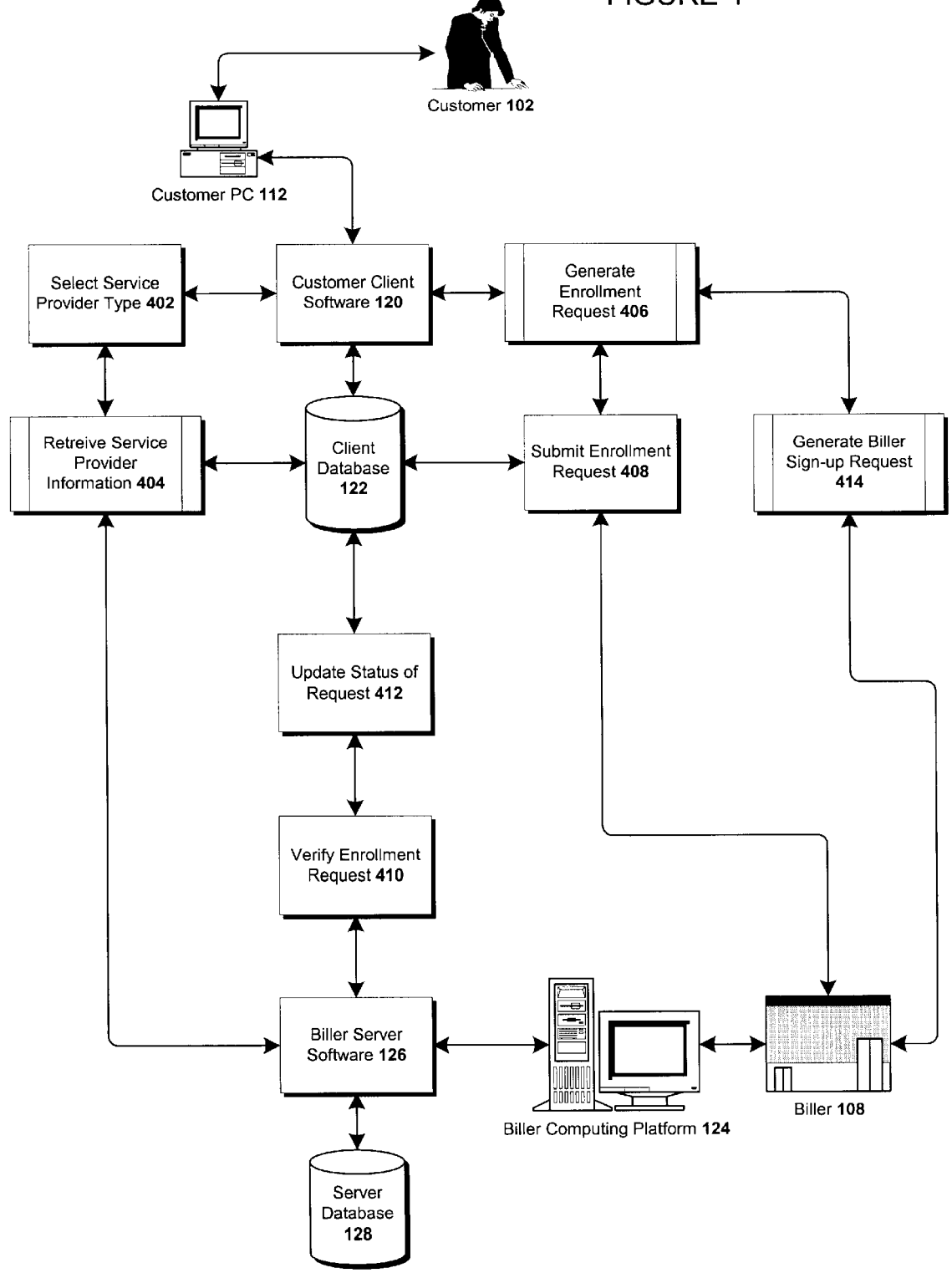
FIG. 4 is a schematic overview of enrollment functions constructed and arranged in accordance with a preferred embodiment of the present invention.

Enrollment for electronic presentment of individualized content for customer 102 is described with respect to FIG. 4, and typically involves the following processes.

Service Type

When customer 102 enrolls for a service, it is necessary to define the type of service (i.e. bill presentment and payment, brokerage, subscribed content, and the like) in a step of selecting the service provider type 402. Information on the type of service is stored in client database 122.

Service Provider Directory

Once the service type has been selected, customer 102 must select the service provider or biller 108. At this point, customer 102 typically connects to directory site 116 and is presented with a list of available service providers for the type of service specified which is retrieved from directory database 118. Alternatively, the list of providers may be retrieved from client database 122 if such information has been pre-loaded. Customer client software 120 may also update the service provider list in client database 122 periodically and may also be updated using information from directory site 116 or directly from biller 108.

When accessing directory site 116, each service provider must have a name which customer 102 can use to identify the service providers to enroll with. For example, in the case of bill presentment and payment services, this is a list of each biller 108. While the billing companies may themselves contract bill presentment and payment services to an outside provider of these services, the names in directory database 118 are the names of each actual biller 108 and not the name of the company contracted by biller 108 to provide these services. In cases where there are payments associated with the service requested, there may also be a separate payment server 134. However, from the perspective of customer 102, the service provider is the biller and the fact that biller 108 has contracted to have payment services provided by a separate payment server 134 is transparent.

Once customer 102 has selected a service provider, customer client software 120 retrieves the service provider information 404 and this additional information is stored in client database 122. The information includes how to communicate with the service provider (typically biller 108) when requesting services or paying bills, the frequency of bills or statements, a billing cycle indication and the like. This typically also includes information such as the web site of the service provider. The fact that the services may be provided by another company on behalf of biller 108 may also be reflected in this information.

When customer 102 cannot find a content provider in biller directory 148 or that content provider is listed but is not currently providing electronic presentment of statements and bills nor receiving electronic payments through the system of the invention, customer 102 can contact biller 108 directly to obtain the information. Alternatively, directory site 116 may send biller 108 an email requesting that they provide the service to their customers. Also, an email message may be automatically generated at the customer's computing platform for sending to the biller in a procedure of generating a biller sign-up request 414. The email address may be entered manually by customer 102 or retrieved from an electronic business directory (electronic yellow pages).

Specification of Content Provider Account

Customer 102 must provide information to identify an account number which has been opened with biller 108. Initially, this may be handled by having customer 102 enter the account number during the generate enrollment request process 406. Alternatively, this could be handled by linking to biller Internet site 132 to retrieve a list of accounts for customer 102. Additionally, enrollment request process 406 may include information required to verify the account at biller 108 (i.e. mother's maiden name, Social Security No., and the like).

Specification of Funding Account

If there are payments associated with the service for which customer 102 is enrolling, then information on funding account 106 is also provided during enrollment request process 406. Customer client software 120 will preferably only allow those types of accounts (bank account, credit card, etc.) for which biller 108 will accept payment.

Submitting the Enrollment Request(s)

A procedure for submitting an enrollment request 408 is initiated from customer client software 120 after selecting a service type, service provider, service provider account number and funding account, as described above. The following occurs once this information has been provided:

1) The enrollment request (including the service provider account) for the service requested is recorded in client database 122 with a status of pending.
2) The enrollment request is forwarded to biller 108. The request includes the service type, service provider name, and the service provider account number as well as the user profile of customer 102 who submitted the enrollment request. The service enrollment request status remains as pending until the service provider has processed the request and verified the service provider account number.
3) If the service requested requires payments, then a separate enrollment request for payment services is sent to biller 108 (or payment server 134 selected by the service provider in the case where biller 108 uses a separate payment server 134). The request includes funding account information (including the PCS if available) as well as the user profile. The service enrollment request status remains as pending until the service provider has processed the request and verified the service provider account number.

The fact that separate requests are submitted for presentment services and payment services is transparent to customer 102. This is done to accommodate the situation where biller 108 has different web sites for presentment and payment (or has contracted out payment services to a separate payment server 134).

Biller server software 126 abstracts the actual enrollment message so that any message format can be used. A variety of request/response message formats can be supported such as IFX, OFX, and the like for bill presentment and payment services.

Provider Verification

Biller server software 126 at biller 108 receives enrollment requests from customer client software 120 to activate services at that service provider. Biller server software 126 records the enrollment request in server database 128 with a status of processing. To complete processing of the enrollment request for biller 108, it is necessary for biller 108 to verify the enrollment request 410 and the identity of customer 102 requesting services. Service provider account verification is likely to vary quite widely from one service provider to another. Biller server software 126 will include a set of interfaces to a service provider process which verify the service provider account as well as the overall request to activate services.

An API to a process provided by biller 108 which verifies the account number and the overall enrollment request may be defined by biller server software 126. This allows biller server software 126 at biller 108 to verify the enrollment request in real time. Biller server software 126 will update the status of the enrollment request 412 in server database 128 based on the result returned by verify enrollment request process 410. Biller server software 126 will also return the result of the enrollment request to customer client software 120.

If biller 108 is unable to verify the account and enrollment request in real time, then an API is supplied for a batch verification process. API functions are provided to retrieve pending enrollment requests from server database 128, and to update the status of the enrollment request in the server database 128. Biller 108 may also wish to send an email notification upon receipt or verification of an enrollment request. This may preferably be accomplished directly from the applications described above which use the API. In addition, biller server software 126 and/or API may preferably allow biller 108 to return an indication that an email should be sent to customer 102 when certain events such, as the receipt of an enrollment request or verification of an enrollment request, occur.

Funding Account Verification

Biller server software 126 generally includes a payment module at biller 108 (or service provider designated payment server 134) which receives enrollment requests from customer client software 120 to activate payment services. Biller server software 126 records the enrollment request in server database 128 with a status of processing. To complete processing of the enrollment request, it is necessary for biller 108 to verify the account and identity of customer 102 requesting payment services. Verification of payment accounts is likely to vary somewhat from one service provider to another, although probably not as much as the verification of service provider accounts. As a result, biller server software 126 will also define a set of interfaces to a service provider process which verifies the funding account as well as the overall request to activate payment services.

In addition, since many funding accounts may be verified via completed ACH transactions (or other completed electronic fund transfer transactions), biller server software 126 payment module may include a default application for the batch verification of funding accounts using ACH transactions.

An API to a process provided by biller 108, which verifies funding account 106 and the overall enrollment request, will be defined by biller server software 126. This allows biller server software 126 at the service provider to verify the payment enrollment request in real time. Default logic will be provided by biller server 130 to recognize a PCS returned from the funding account verification performed by another service provider. If biller 108 wishes to ignore the PCS, or has another mechanism to verify the funding account in real time (perhaps via the ATM network) or simply prefers to run its own batch process, then the default logic provided with biller server software 126 can be replaced.

Biller server software 126 will update the status of the enrollment request in server database 128 based on the result returned by the service provider verification logic. Biller server software 126 will also return the result of the enrollment request to customer client software 120.

If biller 108 is unable to verify funding account 106 and enrollment request in real time, then an API is supplied for a batch verification process. API functions are provided to retrieve pending payment enrollment requests from server database 128, and to update the status of the enrollment request in server database 128. Since it is expected that biller 108 may not be able to verify funding account 106 in real time, a pair of batch funding account verification applications may also be provided with biller server software 126 payment modules. The first batch funding account verification application retrieves all pending payment enrollment requests and, for example, may write an ACH pre-note transaction in the amount of $0.00 to verify funding account 106. The second batch funding account verification application reads a result file returned from the ACH network and updates the enrollment requests in server database 128 accordingly.

Billers who do not wish to use the provided batch verification applications may write their own applications which use the API to read pending enrollment requests, verify the enrollment using logic provided by the service provider, and then use the API to update the pending enrollment requests.

In the embodiment in which the payment certification string remains with customer client software 120, the funding account information is extracted from the payment certification string and sent to a certifying authority or biller 108 where it is validated as above. In this case, a validation string or command to create the string on the client application is communicated back to customer client software 120 and used to modify or create a validation indicating portion of the payment certification string to indicate that the funding account is indeed valid.

Tracking Enrollment Status

After the service and payment enrollment requests have been submitted from customer client software 120 to biller server software 126 and processed by biller server software 126, it is necessary for customer client software 120 to update the status of the enrollment request in client database 122. There are several methods in which this may be accomplished.

Real Time Enrollment Verification

If biller 108 is capable of verifying the service provider account and/or funding account 106 using a real time biller server plug-in, then the response returned to customer client software 120 for the enrollment request contains the result of the account verification/enrollment request. Otherwise, biller server software 126 returns a status of processing for the enrollment request(s). In this case it is also necessary for customer client software 120 to either be notified that the enrollment has been processed, or to periodically request the status of the enrollment request from the service provider to determine when and if the enrollment request is verified or both.

Polling for Enrollment Status

Customer client software 120 periodically may query biller server software 126 at any biller 108 for which there are pending enrollment requests. Customer client software 120 will update the client database 122 on customer PC 112 to reflect the status of the enrollment request returned from biller server software 126. Customer client software 120 queries for enrollment status generally at least each time customer 102 logs in to customer client software 120. The determination of whether to poll a given service provider will typically be based upon pending enrollment requests which customer client software 120 retrieves from client database 122. In addition, customer client software 120 may support explicit requests from customer 102 to update the status of pending enrollment requests.

Email Notification from Service Provider

Another approach for notifying customer client software 120 that the enrollment request has been processed is to have biller 108 send an email to customer 102 when the enrollment has been processed. The email may contain a shortcut which invokes customer client software 130. If the email includes all the information necessary to update the status of the enrollment, then this data can also be passed to customer client software 120 when it is invoked from the email. If the email does not include information necessary to update the status, then customer client software 120 communicates with biller server software 126 at biller 108 to retrieve the status of the enrollment. In this case the email would need to contain information, which when passed to customer client software 120, enable it to access biller 108 biller server software 126. Another variation of the email notification approach would be to have customer client software 120 look for emails from specific billers in the Inbox of customer 102 email system.

Enrollment Extensions

Several varieties and uses of the enrollment process are contemplated within the scope of the invention. Several examples are described below.

Traditional Enrollment

Traditional Enrollment refers to the case where the enrollment is not initiated electronically. For example, biller 108 may include an insert with a printed bill that says "Check this box if you never want to receive another bill in the mail again!". In this scenario, electronic enrollment is initiated on behalf of customer 102 by a customer service representative of biller 108. The main difference from the perspective of the software between traditional enrollment and electronic customer initiated enrollment is that customer client software 130 is unaware of the traditional enrollment request. This is addressed by having an option in the GUI in which customer 102 can record the fact there is a traditional enrollment request pending with biller 108. When customer client software 130 updates the status of the traditional enrollment request it also needs to "import" information recorded during the traditional enrollment, such as customer 102 service provider account number and funding account 106 information which was provided to the customer service representative.

Person to Person

Another possible use for the system and method of the invention is to facilitate person to person transactions such as paying the rent. In this case it would not be feasible to list every person with a checking account in the list of Service Providers. In addition, it is not likely that the payee (the landlord in this example) will have a server to initiate and send a rent bill to the payer (the tenant).

In the case where the payment is not sent in response to an electronic bill it is still desirable for the payer to have a record of what the payment was for. This can be handled by having the Client create the statement (i.e. a rent invoice).

These types of transactions may be handled in one of the following manners.

1. The payee biller 108 gives the payer customer 102 information about the payment account (e.g., biller financial institution 110). Customer 102 then defines biller 108 to customer client software 120 and initiates payment instructions from customer client software 120 to the biller server software 126.
2. The payee biller 108 signs up with a payment processing service to receive payments and provides payment account information at biller financial institution 110 to the service provider. The payer customer 102 then connects to the payment processing service to submit payments by selecting biller 108 as the recipient of the payments and by providing funding account information 146 and customer account information. This approach eliminates the need for customer 102 and biller 108 to exchange payment account information directly.

Elimination of Printed Statements

Once customer 102 has enrolled for electronic statement delivery, it is no longer necessary to receive printed statements. As a result, biller 108 can leverage the enrollment process to also disable printing paper statements for those customers who have enrolled for electronic bill presentment services. This may be accomplished in several manners. One is to have biller server software 126 account verification logic provide a notification to biller 108 statement generation process. Another alternative is to have the statement provider application at biller 108 retrieve the enrolled users list from server database 128 using an API.

Content Management and Retrieval

Content management and retrieval of individualized content for customer 102 and directed responses thereto are now described, and typically involves the following processes.

Content Provider Summary Management

Biller server software 126 maintains and provides access to statement summary data in support of bill presentment services. An API function may import statement summary data into server database 128. Summary data may be retrieved in other ways as well. Biller server software 126 includes auxiliary applications which read files containing statement summary data in common industry standard formats (IFX, OFX, CheckFree, and the like) and use the API to import statement summary data into server database 128.

In addition, an API function is provided to both export and delete statement summary information. These API functions make possible support for the backup and deletion of expired statement summary data in server database 128. Biller server software 126 may also include applications which use these API functions for maintenance of server database 128. These applications may be controlled by configuration options, such as the number of days to retain statement summary information and the like. Another option for the statement summary backup application would be to archive expired statement summary data in a document archive system, to provide access to this historical data even after it is deleted from server database 128.

Content for New Subscribers

The enrollment request process typically returns the date when content will be available for newly enrolled subscribers. In cases where new content cannot be retrieved until the next statement cycle, the enrollment result will indicate the next date when electronic statements are available for the newly enrolled user.

To make content available for newly enrolled users, it is necessary to either import content summary information into server database 128 or to have a plug-in which provides the content summary information by analyzing the source of the data. One approach for importing content summary for newly enrolled users is to first export new enrollments to an external application/file. The external application then retrieves statement content for newly enrolled users and calls the API to import the content summary into server database 128.

New Content Notification

Once a biller 108 has new content available for enrolled customer 102, they may wish to send an email notification to customer 102. This can also be accomplished by a plug-in or option to the application which imports new statement summary information into server database 128. Alternatively, a separate application processes the statement summary file and sends emails to customer 102. A third option would be to have an application which calls the API to access new statement summary data in server database 128 and sends emails to each customer 102 in the list.

Content Retrieval

Once the new content is available at biller 108 it is necessary for customer 102 to retrieve this information and store it at customer client software 120. Customer client software 120 first receives content summary information which is stored in client database 122 on customer PC 112. If necessary, customer client software 120 retrieves statement detail information which may also be stored in client database 122; statement detail is described in more detail later. In order to retrieve new content, customer client software 120 needs to be aware that new content exists; there are several methods in which customer client software 120 may retrieve new content.

Polling for New Content

Customer client software 120 can query biller server software 126 to request new statements. The determination of which service providers to poll will typically be defined in client database 122. This information may be in the form of a next statement date returned with the previous statement, a biller 108 or customer 102 defined statement cycle date or billing period, and the like. Customer client software 120 can automatically determine which biller 108 to poll for new content when the user logs in, in a manner similar to the polling for pending enrollment requests. In addition, customer client software 120 may receive explicit requests to poll for new content issued from customer 102.

Email Notification

Another approach for notifying customer client software 120 of new content is for biller 108 to send an email notification. This would be particularly useful for a biller 108 who provides ad hoc content delivery. The methods for retrieving the new content via an email notification are pretty much the same as for retrieving the status of pending enrollment requests so are not discussed in any more detail here.

Content Summary and Detail

All content returned to customer client software 120 typically has a summary information flag which describes what type of content that has been returned. For certain types of content, the content summary may also include actual data. For example, for bill presentment services, the content summary includes values such as amount due, payment due date, minimum payment due and the like. In addition, customer client software 120 may store content detail in client database 122. Customer client software 120 may also store each new instance of content detail (for example a bank statement) in a separate file on the desktop; the file name containing the content detail is included in the content summary information stored in client database 122. In addition, client database 122 content summary may include information about the type of data in the content detail file. This allows different content providers and billers to provide detail content in whatever format is most convenient. For example, content summary and detail information may be stored in a mark-up language (HTML, XML and the like), a document format (PDF, word processing, spread sheet or the like), print stream formats (Postscript, PCL, AFP and the like), image formats (JPEG, GIF, and the like) or any others. A viewer for the content detail is available to customer client software 120; for example a browser application is invoked by customer client software 120 when viewing HTML content detail.

Service Provider Content History

In some cases it may be desirable for customer client software 120 to retrieve historical data from biller 108. One example would be to recover data that had been lost from client database 122 such as billing and payment history from a bill presentment and payment provider. Another instance would be a newly enrolled customer 102 of bill presentment services who would like desktop access to account activity which occurred prior to enrolling for these services.

This requires that biller 108 keep electronic archives of content. If biller 108 is managing content themselves, then content for historical data is provided via a plug-in, just as with current content. Biller server software 126 also provides mechanisms to return content history if biller 108 is using a separate software application or outside service to store content. Biller 108 can define rules which instruct biller server software 126 on how to locate both historical summary and detail data in the archives.

One other approach would support the background retrieval of content history into server 132 database. This approach would use the API functions to retrieve pending requests for content history and to import the content summary into server database 128.

Premium Content

In some cases the content provider may require advance payment to access certain premium content. In this case biller server software 126 response to a request for statement information is an indication that payment is required to access the content. The method of payment for accessing the content is determined by biller 108. For example, biller 108 may require immediate payment from customer 102 through customer client software 120. Otherwise, biller 108 may send an indication to customer client software 120 that the customer account at biller 108 will be charged a fee and ask customer 102 to accept these terms in order to access the content.

One example of premium content for a bill presentment provider or biller 108 would be access to statement history. In this case the customer server software 130 could be used to provide access to non-current statements as a premium service. After customer 102 has accepted these charges, biller server software 126 would add an entry to server database 128 which indicates the subscriber has access to the premium content. This content would then be available for a certain period of time after which the record in server database 128 which grants access to the premium content would be removed during server database 128 maintenance/clean up processes.

Interactive Content at biller 108

In addition to content summary and detail information which is stored in client database 122, biller 108 may provide interactive content which is accessed directly at a biller 108 web site. For example, biller 108 could have an interactive statement which is accessed at biller Internet site 132.

The foregoing discussion regarding statement summary data and detail content has been illustrated primarily with bill payment and bill presentment services. It can easily be understood, however, that biller server software 126 can be used to store and maintain summary data of other types of content, such as bank account statements, magazine articles reprints, financial information, voting proxy requests, insurance policy proposals, loan proposals and the like. Service providers who do not wish to maintain statement summary data in server database 128 may provide a plug-in to biller server software 126 which uses the API to retrieve statement summary from the service provider's databases.

Payment Processing

Payment processing between customer 102 and biller 108 is now described, and typically involves the following processes.

Biller server software 106 generally includes a payment module which is used by biller 108 to process payment requests submitted by customer client software 120. Alternatively, a separate payment server 134 may be used. Payment request and payment processing are described below.

Payment Requests

There are several methods in which a payment request can be submitted from customer client software 120. In the most common scenario a payment request is submitted to biller 108 or payment server 134 after customer 102 has received and reviewed a bill summary and/or detail. Customer client software 120 preferably provides a "pay all" option in which the subscriber can initiate payment requests for all bills due with a single mouse click. During the enrollment process, customer 102 may specify a default funding account 106 to be used for payments to biller 108. When customer 102 clicks "pay all" from the GUI, customer client software 120 generates payment requests using the default funding account 106 specified for each biller 108 account. Additional default payment options may also be specified at customer client software 120 in support of the "pay all" option such as whether to pay the minimum amount due or some other percentage of the bill, whether to pay immediately or to schedule the bill to be paid on or before the due date and so on.

Payments for other service providers who do not send electronic statements can also be defined to customer client software 120 (i.e. paying the rent). In this case it would also be convenient if customer client software 120 could either automatically submit the payment request (i.e. recurring payments scheduled at customer client software 120 instead of at the payment service provider) or to provide some sort of notification that the payment is due. A notification could be handled by having customer client software 120 create a statement on behalf of the service provider. In addition, customer client software 120 provides reminders for payments which are soon coming due. This customer client software 120 feature may also provide a calendar which illustrates when payments are due. Another extension and/or intelligent agent allows access to the data in client database 122 to provide cash flow analysis for customer 102.

Customer client software 120 GUI also provides a "Get bank account balance" option which can be used to access bank account balance information web site of the financial institution which manages funding account 106 to be used for payments.

Payment Request Processing

Biller server software 126 typically includes a payment module at biller 108 (or biller 108 may designate a payment service provider maintaining payment server 134 as discussed below) and receives payment requests from customer client software 120 to activate payment services. Biller server software 126 records the payment request in server database 128 with an appropriate status indicator (Scheduled, Processing, etc.) Biller 108 may also utilize a biller server software 126 plug-in which is invoked when payment requests are received. The payment request plug-in could be used to provide a hook into the payment provider's existing payment/accounts receivable systems. The payment request plug-in could also process the payments in real time if the service provider has access to these capabilities (i.e. through the ATM network).

Biller 108 may also wish to send an email notification to customer 102 upon receipt or processing of a payment request. This could be accomplished via plug-ins to the applications described above which use the API. In addition, the biller server software 126 and/or API could be enhanced to allow biller 108 to return an indication that an email should be sent to customer 102 when certain events, such as the processing of a payment, occur.

As described, biller 108 may handle payment requests internally through functionality in biller server software 126, or biller 108 may use a separate payment server 134. Moreover, biller 108 can out-source payment functions to a third-party who maintains payment server 134. In the case of a separate payment server 134, biller server software 126 communicates with payment server 134 and can then record the payment request in server database 128.

Payment Processing

To process payment requests it is necessary for biller 108 or payment server 134 to submit the payment request to a payment system. The ACH network may be commonly used to process payments involving transfer of funds between customer 102 and customer financial institution 104, biller 108 and biller financial institution 110. As a result, the biller server software 126 payment module or payment server 134 will also define a set of interfaces to access and update payment request information in server database 128. In addition to payment requests explicitly submitted from customer client software 120, the API will also provide access to customer 102 authorized recurring payments which are automatically submitted by biller 108 on behalf of customer 102.

Since it is expected that most payments will involve transferring funds between the bank accounts of customer 102 and biller 108, applications are provided with the payment module to process these payment requests. The first application uses the API to retrieve payment requests (both those initiated explicitly by customer 102 as well as those initiated by biller 108 on behalf of customer 102). An ACH transaction, for example, is generated and written to a file which is later submitted to the ACH network for batch processing. The second application reads the ACH response file returned from the ACH network and calls the API to update the status of the payment requests. These applications also may invoke a biller 108 payment processing plug-in logic; this allows biller 108 to hook into existing payment and/or accounts receivable systems. In addition, biller 108 may replace the payment processing applications provided with the server payment module with their own applications which use the API to access payment requests and update the status of these requests as a batch process or in real time.

Client Database Import/Export

Customer client software 120 can import and export information from desktop client database 122 to other common formats (text files, HTML, spreadsheet, and the like).

A similar mechanism to the "import" facility in customer client software 120 traditional enrollment process may be used to refresh desktop client database 122. This may be necessary when data in client database 122 has been lost or when customer 102 uses customer client software 130 from more than one computer to keep all of customer 102 desktop client 118 databases on multiple machines in synch.

Customer client software 120 also provides the ability to export data maintained by client database 122 to external files and applications. One use for an export capability would be to export financial information into Personal Finance Manager software such as Quicken and Microsoft Money. Another possible use for exported data is for importing into a cash flow analysis program.

Combining the export and import capabilities allows customer client software 120 to provide client database 122 maintenance capabilities such as backup/restore. This feature could also be useful to synchronize client databases 118 in the scenario where a user has installed customer client software 120 on multiple computers.

An alternative embodiment in which the payment certification string never leaves the customer PC 112 is now described. In this case, a payment certification string is created for each funding account 106 at the customer client software 120 when the customer 102 sets up a new funding account. The payment certification string contains all of the funding account information; that is, all information necessary to validate a funding account and to identify the funding account to a payment server 134. For example, in the case of a checking account, this generally includes the name, address, driver's license number or social security number, bank routing code, account number of the customer. For a credit card account, it might include the name, address, account number and expiration date of the customer.

The payment certification string in this embodiment also contains a validation indicating portion which indicates whether or not the funding account has been validated. On creation or any modification, the portion is set to indicate invalid until validation occurs. The entire payment certification string is encrypted and stored within the customer client software 120. Preferably, access to creating and modifying the payment certification string on the client application will be protected by a password or other means uniquely associating any given funding account and payment certification string with the person whose password it is.

The customer client software 120 does not send the payment certification string to the certifying authority; rather, it extracts the funding account information necessary for validation and sends that to a validation server using a secure communication channel. Once the funding account is validated by the certifying authority, the validation indicating portion is set to indicate that the funding account is valid.

Preferably, the customer may not modify or view funding account information unless he or she has logged in with a password. Whenever the customer modifies a funding account, the validation indicating portion is reset to invalid until the payment certification string is validated again. The customer can de-activate a funding account, in which case the validation indicating portion of the payment certification string is reset to invalid.

The customer client software 120 will not send payment instructions from a funding account unless the payment certification string validation indicating portion is marked as valid. Further, in a preferred embodiment, the customer client software 120 must first be authorized by entering a password to control the application, or the customer may directly enter the password as necessary to authorize the client application to send the payment information from the payment certification string to the payment server 134. The customer client software 120 does not send the payment certification string to payment server 134. Rather, customer client software 120 extracts the information necessary for bill payment, and sends that along with the payment instructions (amount and date) using secure communications.

The electronic payment process consists of four major parts.

1. Creating Funding Accounts—This occurs at the customer client software 120. The customer enters information pertaining to the desired funding source they want to use to pay billers, such as Credit Card or Checking Account numbers.

The customer enters the appropriate information for the funding account. When satisfied, the customer presses an OK button or the like. The information entered on the screen is edited to insure that the correct field sizes are entered. After editing the data, the customer client software creates a payment certification string that contains all the information in encrypted form. The payment certification string is stored in a manner that protects it from accidental or malicious tampering.

The payment certification string contains the funding account information necessary to send payment instructions to billers, and a flag or validation indicating portion which indicates whether or not the particular funding account information has been validated by a certifying authority. At creation time, the payment certification string is marked invalid.

2. Validation of the Funding Account—Once the funding account information has been entered, it is validated by a certifying authority and the payment certification string is modified such that the validation indicating portion is marked as valid by the customer client software.

It should be noted that in this embodiment, the payment certification string never leaves the desktop. This is a safety/security feature. The data is merely validated by the certifying authority, and then the payment certification string is marked valid, all on the customer PC 112.

The validation process begins when the customer presses DONE or the like on the customer client software. The process proceeds as follows:

a. In a preferred embodiment, the customer enters the password secured customer client software.

b. A secured link or communication channel is established between the customer client software and the validation server.

c. If a password secured client application is not used, then the password may be entered after the secured link is established before the information in the payment certification string is accessed.

d. The information necessary for validation is extracted from the payment certification string and transmitted to the validation server.

e. The validation server connects to the appropriate validation source for either credit cards or for checks and validates the information.

f. If the information is invalid, an error message is received by the customer client software.

e. If the information is valid, a validation string is received by the customer client software and appended to the payment certification string.

3. Editing a Funding Account—The editing of a funding account information is straight forward. Each time any change to a funding account information is made, the validation indicating portion of the payment certification string is marked as invalid and the funding account information will need to be revalidated as above.

The following steps may be used by the customer:

a. The customer highlights the funding source they wish to edit on the customer client software screen.

b. The customer presses an edit button or the like on the GUI.

c. The customer client software extracts the funding account information from the payment certification string and displays same to customer on the GUI. Preferably, customer client software will require a password from the user prior to allowing access to edit the funding account information.

d. The customer can enter changes the desired item(s).

e. The customer client software creates a new payment certification string from the modified information. Preferably, this payment certification string may be locked with the user's password, or a new password assigned or generated by the user.

f. The customer client software marks the payment certification string as invalid and validates as described above.

Note: until the payment certification string is validated, the customer client software cannot use that funding source for payment. A warning may be given to the customer indicating this fact. In particular, if payments from the funding source are pending, the customer should be advised to cancel and then re-schedule those payments using the new payment certification string once it is validated.

4. Electronic Payment Processing—The PCS can now be used for payment processing. If a funding source has not been used for some period, say 180 days, the customer client software may automatically repeat the validation procedure the next time the funding account information is used.

In yet another embodiment, the functionality of the customer client software runs on a Web page so that the customer can use the payment processing system with any Web browser even if they are not on their customer PC 112. Each customer has his or her own secure, password controlled data partition on the Web server, and accesses his or her own virtual customer client software on a virtual desktop. The payment certification string functionality is therefore exactly the same as described above, but it is available from the virtual desktop and be maintained by the virtual customer client software in ways that will be readily understood by those in the art.

In accordance with the foregoing, a system and method for presenting individualized content from one or more content providers to a user and returning instructions directly responsive thereto is provided; and, more particularly, an electronic bill presentment and payment system is provided which allows a user to work directly from his home PC to obtain bills and other information from several billers and to allow payment of the bills from the user's desktop PC using a single software application. The billing statements and information for each user are aggregated on the user's PC desktop, not through a third party consolidator or other entity, so the user need not be concerned with the biller sharing that user's personal financial information and billing history with an undesired third party. The system is constructed and arranged to securely and privately allow the user to enroll with each biller and retrieve bill statement details and summary information and provide for payment instructions thereto. Furthermore, a database maintained on the user's PC desktop stores historical data and allows the user to link the stored financial data with a personal finance software program or other analytical tool.

The billers are able to efficiently present electronic bills and statements to their customers and automatically process payment instructions without the need of a third party consolidator. Additionally, since payment instructions from customers are received directly by the biller, including future scheduled or periodic payments, cash flow management and analysis for the biller is improved. Furthermore, since the system is constructed and arranged as a separate server application which imports data from the biller's existing electronic bill information system, the security of that existing system is not compromised and the investment in its development and deployment is maximized. Also, the billers need not be concerned with sharing their sensitive customer information with competitors who may be able to acquire such information from a consolidator.

Also in accordance with the foregoing, a system and method for processing a payment from a validated funding account is provided. The system and method uses a payment certification string comprising funding account information of a customer, and validation information of a certifying authority. The system and method permits immediate processing of an ACH payment from a customer to a biller even when there is no established relationship between the customer and the biller, and no signature card of the customer on file with the biller.

It will thus be seen that the objects set forth above, and those made apparent from the preceding description, are efficiently obtained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope or the invention which, as a matter of language, might be said to fall therebetween.

What is claimed is:

1. A computerized system for generating an electronic payment instruction from a source of funds of a customer and validating said source of funds, said system comprising:

a client application operable by a customer;

said client application including computer processor means for generating in response to input of a customer unique funding account information identifying a source of funds for making electronic payments;

said client application including processor means for generating a payment certification string from said unique funding account information, said payment certification string including a validation indicating portion initially indicating that said unique funding account information is invalid at the time said payment certification string is generated;

said client application including processor means for extracting said unique funding account information from said payment certification string only if said validation indicating portion indicates that said unique funding account information is valid;

a validation server in electronic communication with said client application;

means for establishing a secure electronic communication channel between said client application and said validation server;

said client application including means for communicating said unique funding account information extracted from said payment certification string to said validation server over said secure electronic communication channel;

said validation server including means for confirming that said unique funding account information is sufficient to enable the processing of an electronic payment from said source of funds;

said validation server including processor means for generating a validation string specifically associated with said unique funding account information only if said unique funding account information is confirmed;

said validation server including means for communicating said validation string to said client application over said secure electronic communication channel;

said client application including processor means for modifying said validation indicating portion to indicate that said unique funding account information is valid only if said validation string has been received from said validation server; and said client application including means for generating in response to input from said customer an electronic payment instruction authorizing payment to a biller from said source of funds, said electronic payment instruction including said unique funding account information extracted from said payment certification string only if said validation indicating portion indicates that said unique funding account information is valid.

2. The computerized system as claimed in claim 1, wherein said source of funds is one of a checking account, a credit card account, and a debit card account.

3. The computerized system as claimed in claim 1, wherein said secure electronic communication channel is established over a global computer network.

4. The computerized system as claimed in claim 3, wherein said global computer network is the Internet.

5. The computerized system as claimed in claim 1, wherein said means for confirming that said unique funding account information is sufficient to enable the processing of an electronic payment from said source of funds includes successfully processing said electronic payment from said source of funds.

6. The computerized system as claimed in claim 1, wherein said validation string specifically associated with said unique funding account information includes at least one of an electronic signature and a hash function of said funding account information.

7. The computerized system as claimed in claim 1, wherein said funding account information includes the name of an account holder, a payment processing routing code and an account number for an account, and at least one of a driver's license number and Social Security number for said account holder.

8. The computerized system as claimed in claim 1, wherein said client application further includes customer profile information.

9. The computerized system as claimed in claim 8, wherein said customer profile information includes at least one of a customer name, a customer address, a customer identification and an account number associated with a selected biller.

10. The computerized system as claimed in claim 1, wherein said client application further includes password-enabled means for at least one of creating said payment certification string, modifying said payment certification string and extracting said funding account information from said payment certification string.

11. The computerized system as claimed in claim 1, wherein said client application further includes means for transmitting said electronic payment instruction to said biller; whereby said biller can process said electronic payment instruction over one of an electronic network for transferring funds among financial institutions, an electronic cash system, and an automated teller machine network, and receive payment from said source of funds.

12. The computerized system as claimed in claim 11, wherein said electronic payment instruction is transmitted to said biller over a global computer network.

13. The computerized system as claimed in claim 12, wherein said global computer network is the Internet.

14. The computerized system as claimed in claim 11, wherein said electronic network for transferring funds among financial institutions is one of the Automated Clearinghouse Network (ACH), the Society For Worldwide Interbank Financial Transactions (SWIFT) network, and the Clearinghouse for Interbank Payment Systems (CHIPS) network.

15. The computerized system as claimed in claim 11, wherein said electronic cash system is one of E-cash and Netcash.

16. A computerized method of generating an electronic payment instruction from a source of funds of a customer and validating said source of funds, said method comprising the steps of:

providing a client application operable by a customer;

said client application generating in response to input of a customer unique funding account information identifying a source of funds for making electronic payments;

said client application generating a payment certification string from said unique funding account information, said payment certification string including a validation indicating portion initially indicating that said unique funding account information is invalid at the time said payment certification string is generated;

said client application extracting said unique funding account information from said payment certification string only if said validation indicating portion indicates that said unique funding account information is valid;

providing a validation server in electronic communication with said client application;

establishing a secure electronic communication channel between said client application and said validation server;

said client application communicating said unique funding account information extracted from said payment certification string to said validation server over said secure electronic communication channel;

said validation server confirming that said unique funding account information is sufficient to enable the processing of an electronic payment from said source of funds;

said validation server generating a validation string specifically associated with said unique funding account information only if said unique funding account information is confirmed;

said validation server communicating said validation string to said client application over said secure electronic communication channel;

said client application modifying said validation indicating portion to indicate that said unique funding account information is valid only if said validation string has been received from said validation server; and said client application generating in response to input from said customer an electronic payment instruction authorizing payment to a biller from said source of funds, said electronic payment instruction including said unique funding account information extracted from said payment certification string only if said validation indicating portion indicates that said unique funding account information is valid.

17. The computerized method as claimed in claim 16, wherein said source of funds is one of a checking account, a credit card account, and a debit card account.

18. The computerized method as claimed in claim 16, wherein said secure electronic communication channel is established over a global computer network.

19. The computerized method as claimed in claim 18, wherein said global computer network is the Internet.

20. The computerized method as claimed in claim 16, wherein said step of confirming that said unique funding account information is sufficient to enable the processing of an electronic payment from said source of funds includes successfully processing an electronic payment from said source of funds.

21. The computerized method as claimed in claim 16, wherein said validation string specifically associated with said unique funding account information includes at least one of an electronic signature and hash of said funding account information.

22. The computerized method as claimed in claim 16, wherein said funding account information includes the name of an account holder, a payment processing routing code and an account number for an account, and at least one of a driver's license number and Social Security number for said account holder.

23. The computerized method as claimed in claim 16, wherein said client application further includes customer profile information.

24. The computerized method as claimed in claim 23, wherein said customer profile information includes at least one of a customer name, a customer address, a customer identification and an account number associated with a selected biller.

25. The computerized method as claimed in claim 16, further comprising the step of providing said client application with password-enabled means for at least one of creating said payment certification string, modifying said payment certification string and extracting said funding account information from said payment certification string.

26. The computerized method as claimed in claim 16, further comprising the step of said client application transmitting said electronic payment instruction to said biller; whereby said biller can process said electronic payment instruction over one of an electronic network for transferring funds among financial institutions, an electronic cash system, and an automated teller machine network, and receive payment from said source of funds.

27. The computerized method as claimed in claim 26, wherein said electronic payment instruction is transmitted to said biller over a global computer network.

28. The computerized method as claimed in claim 27, wherein said global computer network is the Internet.

29. The computerized method as claimed in claim 26, wherein said electronic network for transferring funds among financial institutions is one of the Automated Clearinghouse Network (ACH), the Society For Worldwide Interbank Financial Transactions (SWIFT) network, and the Clearinghouse for Interbank Payment Systems (CHIPS) network.

30. The computerized method as claimed in claim 26, wherein said electronic cash system is one of E-cash and Netcash.

* * * * *